United States Patent
Kumada

(10) Patent No.: US 9,350,248 B2
(45) Date of Patent: May 24, 2016

(54) POWER SUPPLY DEVICE WITH PARALLEL BUCK CONVERTERS

(71) Applicant: Panasonic Intellectual Property Management Co., Ltd., Osaka (JP)

(72) Inventor: Kazuhiro Kumada, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/417,714

(22) PCT Filed: Jul. 26, 2013

(86) PCT No.: PCT/JP2013/004543
§ 371 (c)(1),
(2) Date: Jan. 27, 2015

(87) PCT Pub. No.: WO2014/020875
PCT Pub. Date: Feb. 6, 2014

(65) Prior Publication Data
US 2015/0207412 A1    Jul. 23, 2015

(30) Foreign Application Priority Data
Jul. 30, 2012  (JP) .................. 2012-168657

(51) Int. Cl.
*H02M 3/158*    (2006.01)
*H02H 9/00*     (2006.01)
(Continued)

(52) U.S. Cl.
CPC ............ *H02M 3/1584* (2013.01); *H02H 9/002* (2013.01); *H05B 33/0818* (2013.01); *H02M 3/155* (2013.01); *H02M 2003/1586* (2013.01); *Y02B 20/346* (2013.01)

(58) Field of Classification Search
CPC ............ H02M 1/32; H02M 2001/008; H02M 2001/009; H02M 2001/327
See application file for complete search history.

(56) References Cited

U.S. PATENT DOCUMENTS 5,428,268 A * 6/1995 Melis ................ H05B 41/2888
                                                315/247
5,663,613 A * 9/1997 Yamashita ......... H05B 41/2923
                                                315/225
(Continued)

FOREIGN PATENT DOCUMENTS

EP   2 213 932 A1   8/2010
JP   62-002860 A    1/1987
(Continued)

OTHER PUBLICATIONS

International Search Report for corresponding International Application No. PCT/JP2013/004543 mailed Aug. 20, 2013.
(Continued)

*Primary Examiner* — Timothy J Dole
*Assistant Examiner* — Yusef Ahmed
(74) *Attorney, Agent, or Firm* — Renner, Otto, Boisselle & Sklar, LLP

(57) ABSTRACT

The power supply device of the present invention includes a main converter and at least one sub converter connected in parallel between a pair of output ends of a DC power supply circuit for receiving power through a parallel circuit of a thyristor and a thermistor having a positive temperature coefficient. Each of the main converter and the at least one sub converter includes: a series circuit composed of a diode and a switching element and connected between the pair of output ends; a series circuit composed of a capacitor and an inductor and connected in parallel with the diode; and a drive circuit configured to drive the switching element. The main converter controls the thyristor in accordance with a voltage across a secondary winding magnetically coupled with the inductor. When a short circuit of the switching element of the at least one sub converter occurs, the drive circuit of the main converter terminates driving of the switching element of the main converter.

6 Claims, 5 Drawing Sheets

(51) Int. Cl.
*H05B 33/08* (2006.01)
*H02M 3/155* (2006.01)

(56) References Cited

U.S. PATENT DOCUMENTS

| | | | | |
|---|---|---|---|---|
| 6,054,674 | A * | 4/2000 | Moriguchi | B23K 9/1043 219/130.21 |
| 6,727,661 | B2 * | 4/2004 | Kominami | H05B 41/2855 315/209 R |
| 7,113,379 | B2 * | 9/2006 | Matsumoto | H02H 3/06 361/20 |
| 2001/0030514 | A1 * | 10/2001 | Takahashi | H05B 41/3921 315/219 |
| 2004/0218319 | A1 * | 11/2004 | Sae-Ueng | H02M 1/36 361/18 |
| 2006/0164050 | A1 * | 7/2006 | Hasegawa | H02M 3/1584 323/272 |
| 2006/0170288 | A1 * | 8/2006 | Usui | H02M 3/33523 307/17 |
| 2007/0262758 | A1 * | 11/2007 | Wildash | H02M 1/4216 323/272 |
| 2009/0134921 | A1 * | 5/2009 | Chiu | H02M 3/33523 327/134 |
| 2009/0251925 | A1 * | 10/2009 | Usui | H02M 3/33561 363/16 |
| 2011/0193495 | A1 * | 8/2011 | Mishima | H02M 3/1588 315/307 |
| 2011/0204823 | A1 * | 8/2011 | Mizukawa | H05B 33/089 315/308 |
| 2011/0309759 | A1 * | 12/2011 | Shteynberg | H05B 33/0815 315/201 |
| 2012/0194090 | A1 * | 8/2012 | Esaki | H02M 3/156 315/200 R |
| 2012/0268028 | A1 * | 10/2012 | Kumada | H02H 9/002 315/226 |
| 2013/0099691 | A1 * | 4/2013 | Esaki | H05B 33/0815 315/210 |
| 2014/0252989 | A1 * | 9/2014 | Knoedgen | H02M 3/33507 315/307 |

FOREIGN PATENT DOCUMENTS

| | | |
|---|---|---|
| JP | 02-159969 A | 6/1990 |
| JP | 2007-189004 A | 7/2007 |
| JP | 2008-104273 A | 5/2008 |
| JP | 2010-177131 A | 8/2010 |
| JP | 2011-078218 A | 4/2011 |
| JP | 2012-064430 A | 3/2012 |
| JP | 2012-099334 A | 5/2012 |
| JP | 2012-100415 A | 5/2012 |

OTHER PUBLICATIONS

Form PCT/ISA/237 for corresponding International Application No. PCT/JP2013/004543 dated Aug. 20, 2013.

* cited by examiner

US 9,350,248 B2

POWER SUPPLY DEVICE WITH PARALLEL BUCK CONVERTERS

TECHNICAL FIELD

The present invention relates to power supply devices.

BACKGROUND ART

In the past, there has been proposed a power supply device which converts power inputted from an external power supply and outputs converted power and includes a thermistor having a positive temperature property (so-called a PTC thermistor) in order to suppress rush current at the time of activation interposed in a power supply path from such a power supply (e.g., see document 1 [JP 2008-104273 A]). In this regard, when excess current such as rush current flows, Joule heat causes a rise in temperature of the thermistor, and this leads to increase in a resistance of the thermistor. Consequently, such current can be suppressed. The thermistor may have such a temperature property that resistance greatly varies with temperature. For example, a resistance of the thermistor at 160° C. is approximate 100 times as high as a resistance of the thermistor at 25° C.

Further, a thyristor is connected in parallel with the aforementioned thermistor and a circuit of the power supply device is configured to keep the thyristor on during stable operation. Rush current is likely to occur only at the time of activation. Therefore, to avoid loss caused by the thermistor, a current is made to flow through the above thyristor during stable operation.

Further, there has been proposed a power supply device including multiple buck converters connected in parallel together between output ends of a DC power supply circuit (e.g., see document 2 [JP 2011-78218 A]). For example, a load such as a light emitting diode array is connected between output ends of each buck converter. The aforementioned DC power supply circuit may be, for example, a capacitor for smoothing a pulsating output of a diode bridge, a conventional boost converter, or the like. In this power supply device, the multiple buck converters can share the DC power supply circuit, but can be different from each other in specifications and operations.

The power supply device including the DC power supply circuit and the multiple buck converters as with document 2 can be modified so that the parallel circuit of the thermistor and the thyristor is interposed in the power supply path to the DC power supply circuit as with document 1.

With regard to the power supply device as modified above, it is assumed that the circuit of the power supply device is designed so that the thyristor is kept on while any of the buck converters operates stably. In this case, even if in one or some of buck converters a switching element may be short-circuited and excess current may flow, the thermistor cannot provide effects of suppression of current while the other(s) of buck converters operates stably.

SUMMARY OF INVENTION

In view of the above insufficiency, the present invention has aimed to propose a power supply device with improved safety.

The power supply device of the first aspect in accordance with the present invention, includes: a parallel circuit of a thyristor and a thermistor having a positive temperature coefficient; a DC power supply circuit having a pair of output ends and being to receive power through the parallel circuit; and multiple buck converters connected in parallel with each other between the pair of output ends of the DC power supply circuit. The multiple buck converters include a main converter and at least one sub converter. Each of the main converter and the at least one sub converter includes: a series circuit which is composed of a diode and a switching element and is connected between the pair of output ends of the DC power supply circuit; a series circuit which is composed of a capacitor and an inductor and is connected in parallel with the diode; and a drive circuit configured to drive the switching element. The main converter further includes a secondary winding magnetically coupled with the inductor of the main converter. The main converter is configured to control the thyristor in accordance with a voltage across the secondary winding of the main converter. The drive circuit of the main converter is configured to, when a short circuit of the switching element of the at least one sub converter occurs, terminate driving of the switching element of the main converter.

In the power supply device of the second aspect in accordance with the present invention which is realized in combination with the first aspect, the at least one sub converter includes a secondary winding magnetically coupled with the inductor of the at least one sub converter. The drive circuit of the main converter is configured to, when a voltage across the secondary winding of the at least one sub converter falls below a reference voltage, determine that a short circuit of the switching element of the at least one sub converter occurs.

In the power supply device of the third aspect in accordance with the present invention which is realized in combination with the first or second aspect, the drive circuit of the main converter is configured to drive the switching element of the main converter in spite of whether a short circuit of the switching element of the at least one sub converter occurs, until predetermined delay time elapses after activation.

In the power supply device of the fourth aspect in accordance with the present invention which is realized in combination with any one of the first to third aspects, the main converter is configured to, when a voltage across the secondary winding of the main converter exceeds a prescribed voltage, turn on the thyristor.

In the power supply device of the fifth aspect in accordance with the present invention which is realized in combination with any one of the first to fourth aspects, the DC power supply circuit is configured to use supplied power to generate a predetermined DC voltage between the pair of output ends.

In the power supply device of the sixth aspect in accordance with the present invention which is realized in combination with any one of the first to fifth aspects, the drive circuit of each of the multiple buck converters is configured to drive the switching element to adjust a voltage between opposite ends of the capacitor.

DESCRIPTION OF EMBODIMENTS

Figure 1:
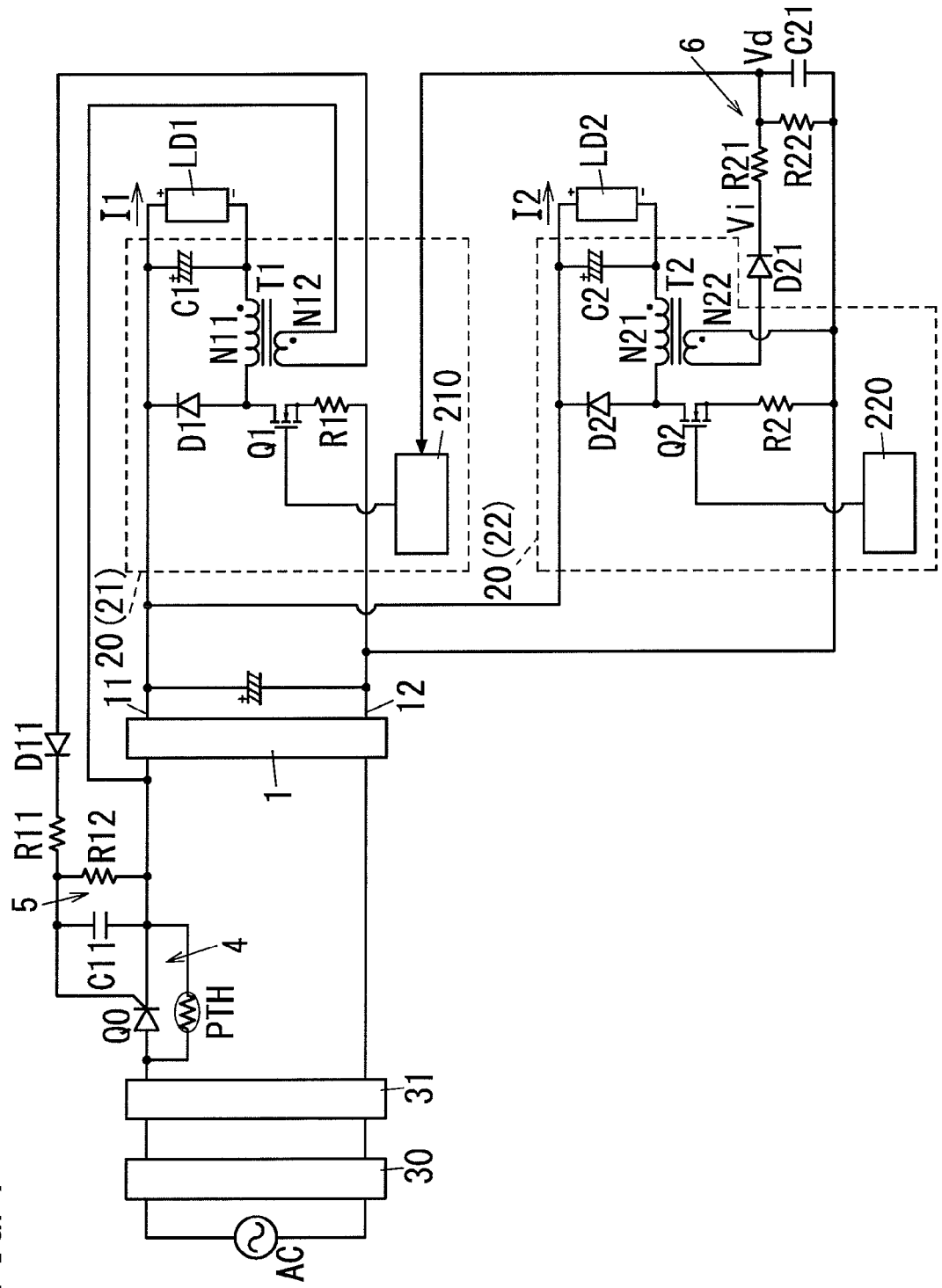
FIG. 1 is a circuit block diagram illustrating a power supply device of one embodiment in accordance with the present invention.

As shown in FIG. 1, a power supply device of an embodiment in accordance with the present invention includes: a parallel circuit 4 of a thyristor Q0 and a thermistor PTH having a positive temperature property (positive temperature coefficient); a boost converter 1 serving as a DC power supply circuit to receive power through this parallel circuit 4; and multiple buck converters 20 (21, 22) connected in parallel with each other between output ends 11 and 12 of the boost converter 1.

Further, the power supply device of the present embodiment includes a diode bridge 31 which performs full-wave rectification on an AC current inputted from an AC power supply AC to input a resultant current into the boost converter 1 via the above parallel circuit. Additionally, the power supply device of the present embodiment includes a filter circuit 30 provided between the AC power supply AC and the diode bridge 31. For example, the filter circuit 30 may include a common mode choke coil to reduce noises. An output end of the diode bridge 31 for receiving a lower potential and the output end 12 of the boost converter 1 for receiving a lower potential are grounded.

The DC power supply circuit (boost converter) 1 is configured to use supplied power to generate a predetermined DC voltage between the pair of output ends 11 and 12. The boost converter 1 is a conventional circuit which is also referred to as a step-up converter, a step-up chopper circuit, and a power factor correction circuit, and provides an effect of improving input current distortion. Note that, the DC power supply circuit may not be limited to the above boost converter 1, but may include a capacitor for smoothing a DC output (pulsating current output) of the diode bridge 31.

As described above, the parallel circuit 4 includes the thyristor Q0, and the thermistor PTH having a positive temperature property (positive temperature coefficient). The thyristor Q0 has an anode connected to an output end of the diode bridge 31 for receiving a higher potential, and a cathode connected to an output end of the DC power supply circuit 1 for receiving a higher potential. The thermistor PTH is connected in parallel with the thyristor Q0. Therefore, while the thyristor Q0 is off, a current flows through the thermistor PTH. In contrast, while the thyristor Q0 is on, a current flows through not the thermistor PTH but the thyristor Q0. In brief, while the thyristor Q0 is off, the parallel circuit 4 suppresses an excess current such as an inrush current. The thermistor PTH has such a temperature property that resistance significantly varies with temperature. For example, a resistance of the thermistor PTH at 160° C. is approximate 100 times as high as a resistance of the thermistor PTH at 25° C.

The multiple buck converters 21 and 22 include diodes D1 and D2 having cathodes connected to the output end of the boost converter 1 for receiving a higher potential, switching elements Q1 and Q2 having one ends connected to anodes of the diodes D1 and D2 and other ends connected to the output end of the boost converter 1 for receiving a lower potential, via resistors R1 and R2, and drive circuits 210 and 220 configured to turn on and off the switching elements Q1 and Q2, respectively.

The above switching elements Q1 and Q2 may be MOSFETs, for example.

Further, in the buck converter 21, 22, a series circuit of a capacitor (output capacitor) C1, C2 and a primary winding N11, N21 of a transformer T1, T2 is connected between both ends of the diode D1, D2. The capacitor C1, C2 has both ends serving as the output ends of the buck converter 21, 22. The capacitor C1, C2 is, for example, an electrolytic capacitor.

In other words, the primary winding (inductor) N11, N21 of the transformer T1, T2 constitutes a loop together with the diode D1, D2 and the output capacitor C1, C2, and acts as an inductor to repeat storing and discharging power in accordance with on and off states of the switching element Q1, Q2.

A light emitting diode LD1, LD2 is connected between the output ends (i.e., the both ends of the output capacitor C1, C2) of the buck converter 21, 22.

The drive circuit 210, 220 changes a duty cycle or a switching frequency of the switching element Q1, Q2 at appropriate timings so that an output current I1, I2 supplied to the light emitting diode LD1, LD2 is kept constant. These drive circuits 210 and 220 can be realized based on conventional techniques, and detailed drawings and explanations of them are omitted.

One of the buck converters 21 and 22 is a main converter 21 configured to turn on the thyristor Q0 in accordance with a voltage induced in the secondary winding N12 of the transformer T1.

The drive circuit 210 of the main converter 21 terminates driving of the switching element Q1 when a short circuit of the switching element Q2 of the other buck converter (hereinafter referred to as "sub converter") 22 occurs. In this regard, the short circuit of the switching element Q2 means a short circuit causing the switching element Q2 to be kept on, such as a short circuit between a drain and a source.

In brief, the multiple buck converters 20 include the main converter 21 and the sub converter (22, 23).

The main converter 21 includes a series circuit of the diode (first diode) D1 and the switching element (first switching element) Q1, a series circuit of the capacitor (first capacitor) C1 and the inductor (first inductor) N11, and the drive circuit (first drive circuit) 210 configured to drive the switching element (first switching element) Q1. The series circuit of the first diode D1 and the first switching element Q1 is connected between the pair of output ends 11 and 12 of the DC power supply circuit 1. In FIG. 1, the series circuit of the first diode D1 and the first switching element Q1 is connected between the pair of output ends 11 and 12 through the resistor R1. The resistor R1 is connected between the first switching element Q1 and the output end 12. For example, the resistor R1 is a resistor for measuring a current flowing through the first switching element Q1, and is used for deciding a timing of turning off the first switching element Q1. The series circuit of the first capacitor C1 and the first inductor N11 is connected in parallel with the first diode D1. The first drive circuit 210 is configured to drive (perform switching control on, or on/off control on) the first switching element Q1 to adjust a voltage between opposite ends of the first capacitor C1. The main converter 21 further includes the secondary winding (first secondary winding) N12 magnetically coupled with the first inductor N11.

The sub converter 22 includes a series circuit of the diode (second diode) D2 and the switching element (second switching element) Q2, a series circuit of the capacitor (second capacitor) C2 and the inductor (second inductor) N21, and the drive circuit (second drive circuit) 220 configured to drive the switching element (second switching element) Q2. The series circuit of the second diode D2 and the second switching element Q2 is connected between the pair of output ends 11 and 12 of the DC power supply circuit 1. In FIG. 1, the series circuit of the second diode D2 and the second switching element Q2 is connected between the pair of output ends 11 and 12 via the resistor R2. The resistor R2 is connected between the second switching element Q2 and the output end 12. For example, the resistor R2 is a resistor for measuring a current flowing through the second switching element Q2, and is used for deciding a timing of turning off the second switching element Q2. The series circuit of the second capacitor C2 and the second inductor N21 is connected in parallel with the second diode D2. The second drive circuit 220 is configured to drive (perform switching control on, or on/off control on) the second switching element Q2 to adjust a voltage between opposite ends of the second capacitor C2.

As shown in FIG. 1, a voltage across the secondary winding N12 is inputted into a control circuit 5 for controlling the thyristor Q0. The control circuit 5 includes a capacitor C11, resistors R11 and R12, and a diode D11. The secondary winding N12 has one end connected to an input terminal of the DC power supply circuit 1 for receiving a higher potential, and another end connected to an anode of the diode D11. The diode D11 has a cathode connected to the input terminal of the DC power supply circuit 1 for receiving a higher potential, through a series circuit of the resistors R11 and R12 (i.e., a voltage dividing circuit). A connection point of the resistors R11 and R12 is connected to a gate of the thyristor Q0. The capacitor C11 is connected in parallel with the resistor R12.

Accordingly, a voltage induced in the secondary winding N12 of the transformer T1 of the main converter 21 is half-wave rectified by the diode D11, and divided by the resistors R11 and R12, and smoothed by the capacitor C11, and then impressed between the gate and the cathode of the thyristor Q0.

Therefore, the main converter 21 controls the thyristor Q0 in accordance with the voltage across the first secondary winding N12. Especially, when the voltage across the first secondary winding N12 exceeds a prescribed voltage, the main converter 21 turns on the thyristor Q0. The prescribed voltage is decided such that the thyristor Q0 is kept on while a current flows through the first inductor N11.

As shown in FIG. 1, a voltage across the secondary winding N22 is impressed on the drive circuit 210 by a voltage detection circuit 6. The voltage detection circuit 6 includes a capacitor C21, resistors R21 and R22, and a diode D21. The secondary winding N22 has one end connected to the output terminal 12 of the DC power supply circuit 1 for receiving a lower potential, and another end connected to an anode of the diode D21. The diode D21 has a cathode connected to the output terminal 12 of the DC power supply circuit 1 for receiving a lower potential, through a series circuit of the resistors R21 and R22 (i.e., a voltage dividing circuit). A connection point of the resistors R21 and R22 is connected to the drive circuit 210. The capacitor C21 is connected in parallel with the resistor R22.

Accordingly, a voltage induced in the secondary winding N22 of the transformer T2 of the sub converter 22 is half-wave rectified by the diode D21, and divided by the resistors R21 and R22, and smoothed by the capacitor C21, and then inputted in the drive circuit 210 of the main converter 21 as a detection voltage Vd.

The drive circuit 210 of the main converter 21 compares the above detection voltage Vd inputted from the sub converter 22 with a predetermined reference voltage Vr. When the detection voltage Vd falls below the reference voltage Vr, the drive circuit 210 of the main converter 21 determines that the switching element Q2 in another buck converter (sub converter) 22 is short-circuited, and then terminates driving of the switching element Q1. In summary, when a short circuit of the second switching element Q2 of the sub converter 22 occurs, the first drive circuit 210 terminates driving of the first switching element Q1.

When driving of the switching element Q1 in the main converter 21 is terminated by the above operation, or when a short circuit of the switching element Q1 of the main converter 21 occurs, a voltage is not induced in the secondary winding N12 of the transformer T1 of the main converter 21. As a result, a voltage is no longer inputted into the gate of the thyristor Q0 and thus the thyristor Q0 is turned off. Thereafter the thermistor PTH suppresses a current.

Figure 2:
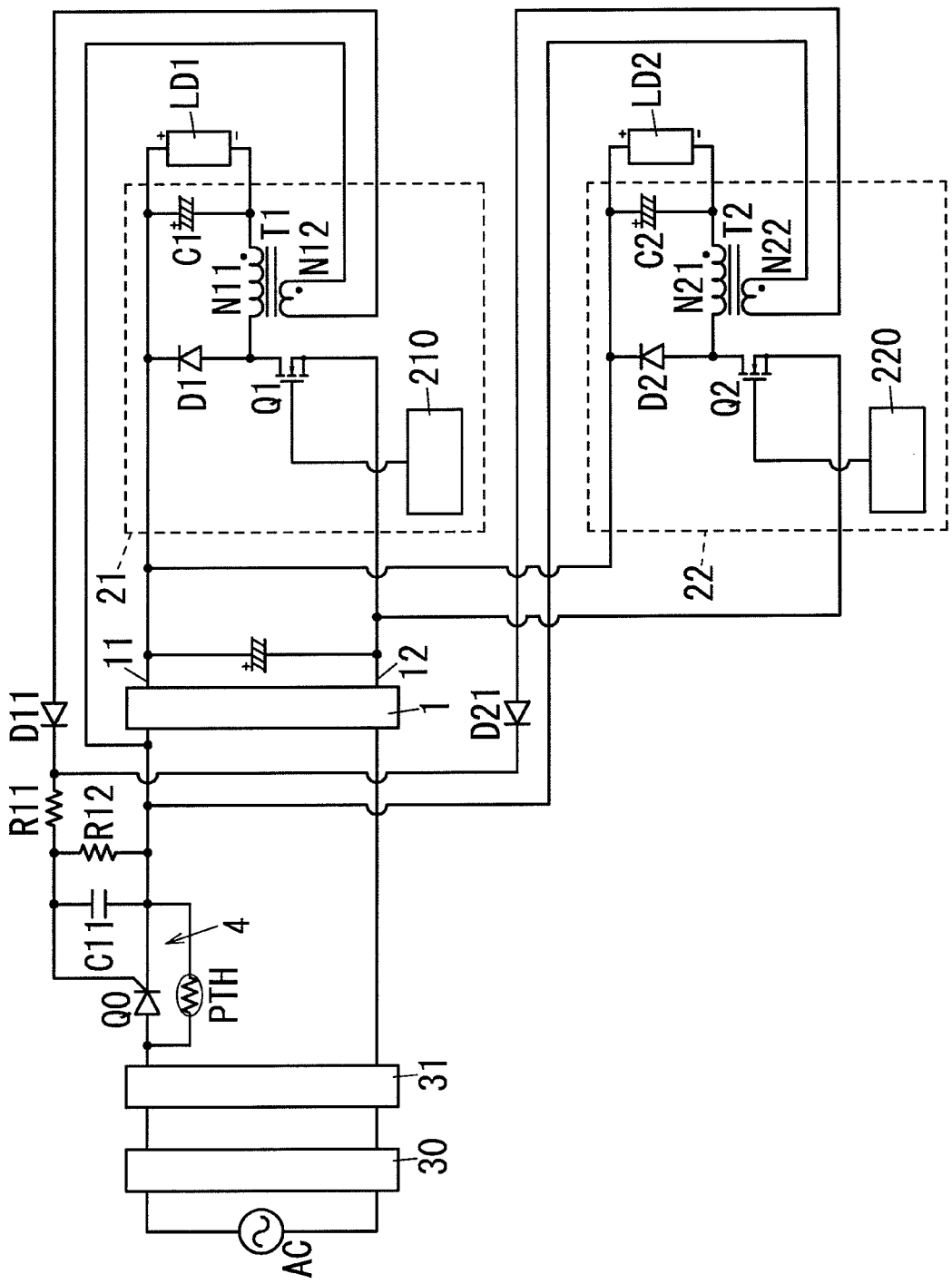
FIG. 2 is a circuit block diagram illustrating a comparative example of the power supply device.

FIG. 2 shows a comparative example of the power supply device of the present embodiment. As shown in FIG. 2, in the comparative example, all of the buck converters 20 (21 and 22) are connected to the thyristor Q0, and the on control on the thyristor Q0 is performed in accordance with any of voltages across the secondary windings (N12 and N22) of the transformers (T1 and T2) of the buck converters 20 (21 and 22).

In the case of the comparative example, the thyristor Q0 is turned off only when all of short circuits of the switching elements Q1 and Q2 of the buck converter 21 and 22 occur. Therefore, even in a case where any of short circuits of the switching elements Q1 and Q2 of the buck converter 21 and 22 occurs, if at least one of the buck converters 21 and 22 still operates, the thyristor Q0 is not turned off, and suppression of current by the thermistor PTH is not realized.

Hence, abnormal heating possibly occurs in the buck converters 21 and 22 in which the switching elements Q1 and Q2 are short-circuited and loads such as the light emitting diodes LD1 and LD2 connected to them.

In contrast, in the power supply device of the present embodiment, even when any of short circuits of the switching elements (Q1, Q2) of the buck converters 20 (21, 22) occurs, the thyristor Q0 is turned off and suppression of current by the thermistor PTH becomes effective. Therefore, in contrast to the comparative example shown in FIG. 2, the present embodiment can provide improved safety.

Further, the thermistor PTH for suppressing rush currents is also used for suppressing currents resulting from a short circuit of the switching element (Q1, Q2) of the buck converter 20 (21, 22). Therefore, in contrast to a case of providing an additional protective element such as fuse, the power supply device of the present embodiment can be produced at a lowered cost.

Figure 3:
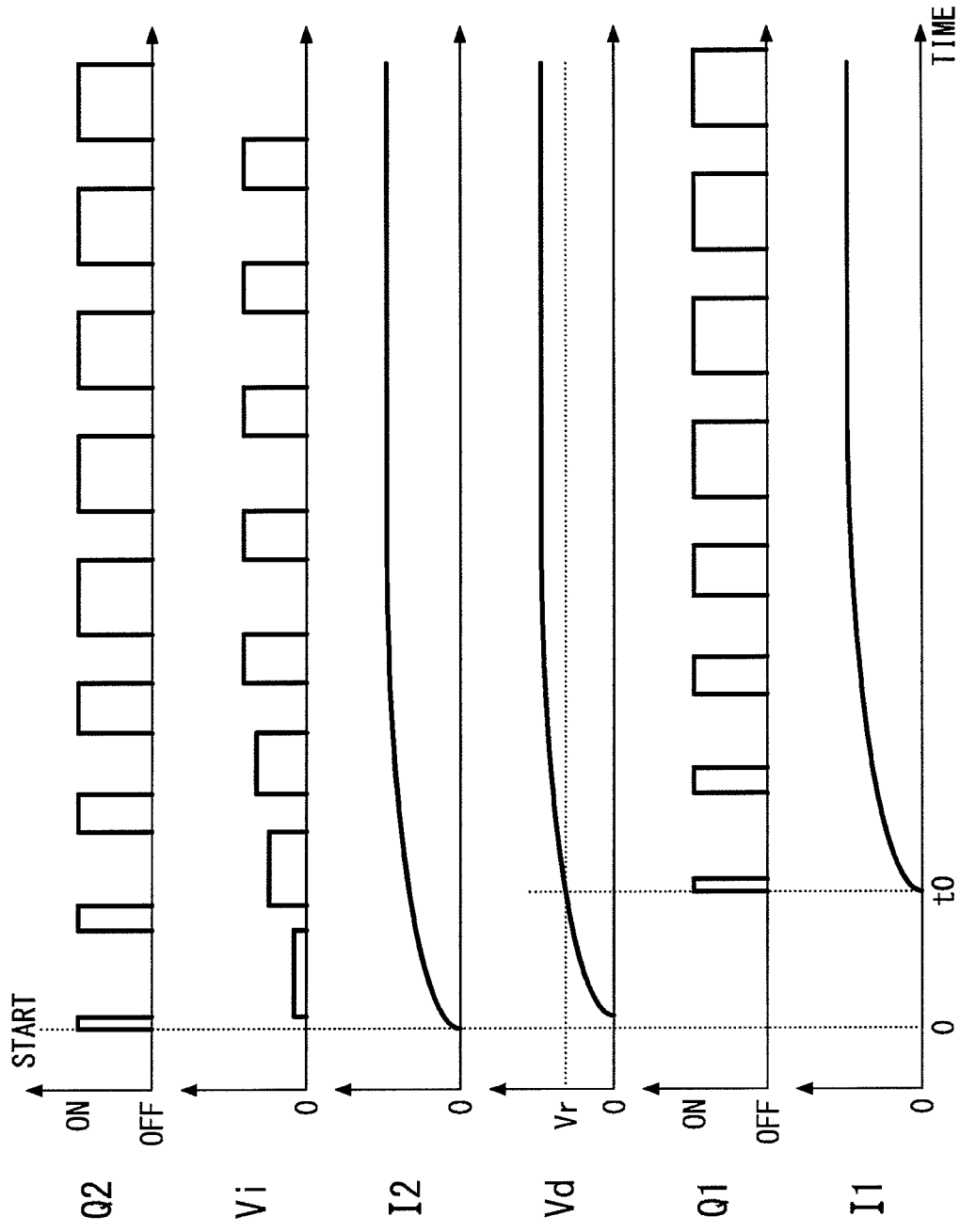
FIG. 3 is an explanatory diagram illustrating operations of the power supply device.

FIG. 3 shows examples of time variations of on and off states of the switching element Q2 of the sub converter 22, a voltage (hereinafter referred to as "induced and rectified voltage") Vi obtained by half-wave rectification on the voltage across the secondary winding N22 of the transformer T2 of the sub converter 22, the output current I2 of the sub converter 22, the detection voltage Vd, on and off states of the switching element Q1 of the main converter 21, and the output current I1 of the main converter 21. In FIG. 3, the horizontal axis indicates elapsed time from activation and this definition is also used in FIG. 4 described later.

As shown in FIG. 3, the detection voltage Vd in the sub converter 22 is zero immediately after activation, and gradually increases with time from activation. Therefore, when the drive circuit 210 of the main converter 21 operates depending on the detection voltage Vd of the sub converter 22 from the time of activation, driving of the switching element Q1 in the main converter 21 does not start until the detection voltage Vd in the sub converter 22 reaches the reference voltage Vr.

As a result, a timing at which the light emitting diode LD1 connected to the main converter 21 is turned on is likely to delay from a timing at which the light emitting diode LD2 connected to the sub converter 22 is turned on.

Figure 4:
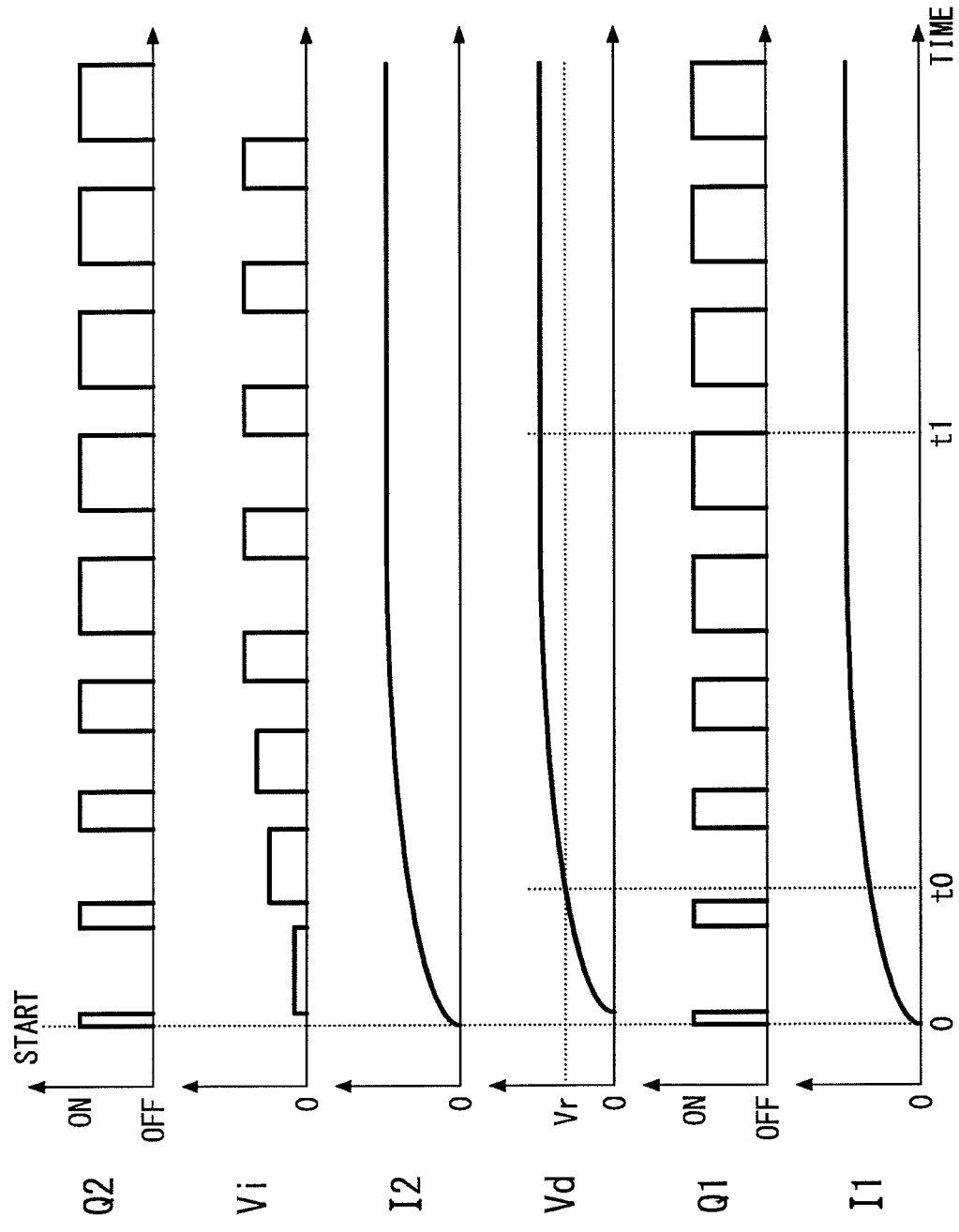
FIG. 4 is an explanatory diagram illustrating operations of the power supply device.

In view of this, as shown in FIG. 4, the drive circuit 210 of the main converter 21 may drive the switching element Q1 regardless of the detection voltage Vd of the sub converter 22 (i.e., regardless of whether a short circuit of the switching element Q2 of the sub converter 22 occurs) during a period (starting period) which starts after activation and ends after a lapse of predetermined delay time t1 from the activation. Note that, the phrase "after activation" means that "after supply of power from the AC power supply AC to the power supply device starts" or "after the drive circuit 210 starts to operate", for example.

To realize the aforementioned operation, the drive circuit 210 may ignore a result of comparison of the detection voltage Vd with the reference voltage Vr during the starting period. Alternatively, to realize the aforementioned operation, the reference voltage Vr may be kept equal to 0 (which means a voltage surely lower than the detection voltage Vd) during the starting period.

It is desirable that the aforementioned delay time t1 is surely longer than time t0 necessary for the detection voltage Vd to reach the reference voltage Vr after activation but is short as possible.

The above configuration can prevent an unwanted situation in which the light emitting diode LD1 connected to the main converter 21 is turned on after the light emitting diode LD2 connected to the sub converter 22 is turned on, as shown in the examples of FIG. 3.

Note that, in FIG. 1, the only one sub converter 22 is provided. However, in FIG. 5, two or more sub converters 22, 23 may be provided. In short, the multiple buck converters 20 may include the main converter 21 and at least one sub converter (22, 23).

Figure 5:
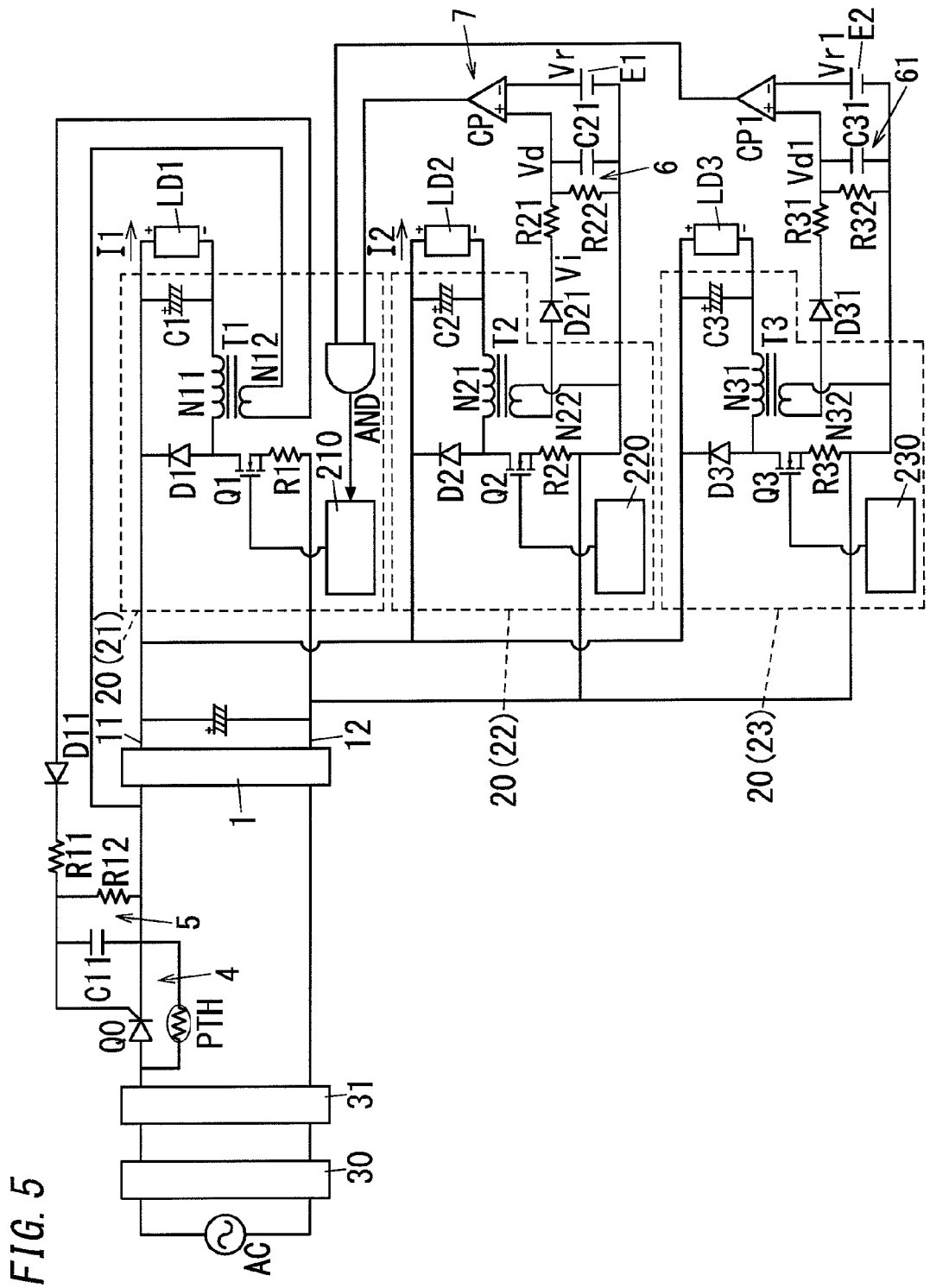
FIG. 5 is a circuit block diagram illustrating a modification of the power supply device.

The sub converter 23 includes a series circuit of a diode (second diode) D3 and a switching element (second switching element) Q3, a series circuit of a capacitor (second capacitor) C3 and an inductor (second inductor) N31, and a drive circuit (second drive circuit) 230 configured to drive the switching element (second switching element) Q3. The series circuit of the second diode D3 and the second switching element Q3 is connected between the pair of output ends 11 and 12 of the DC power supply circuit 1. In FIG. 5, the series circuit of the second diode D3 and the second switching element Q3 is connected between the pair of output ends 11 and 12 via a resistor R3. The resistor R3 is connected between the second switching element Q3 and the output end 12. For example, the resistor R3 is a resistor for measuring a current flowing through the second switching element Q3, and is used for deciding a timing of turning off the second switching element Q3. The series circuit of the second capacitor C3 and the second inductor N31 is connected in parallel with the second diode D3. The second drive circuit 230 is configured to drive (perform switching control on, or on/off control on) the second switching element Q3 to adjust a voltage between opposite ends of the second capacitor C3.

As described above, the sub converter (second sub converter) 23 shown in a lower part of FIG. 5 is different in reference signs from the other sub converter (first sub converter) 22, but is the same in circuit configurations and operations as the first sub converter 22, and therefore detailed explanations are omitted.

In the example shown in FIG. 5, a voltage across the secondary winding N22 is given to a comparison circuit 7 by the voltage detection circuit 6. Further, a voltage across a secondary winding N32 is given to the comparison circuit 7 by a voltage detection circuit 61.

The voltage detection circuit 61 includes a capacitor C31, resistors R31 and R32, and a diode D31. The secondary winding N32 has one end connected to the output terminal 12 of the DC power supply circuit 1 for receiving a lower potential, and another end connected to an anode of the diode D31. The diode D31 has a cathode connected to the output terminal 12 of the DC power supply circuit 1 for a lower potential, through a series circuit of the resistors R31 and R32 (i.e., a voltage dividing circuit). A connection point of the resistors R31 and R32 is connected to the comparison circuit 7. The capacitor C31 is connected in parallel with the resistor R32.

The comparison circuit 7 includes comparators CP and CP1, and an AND circuit AND. The comparator CP has a non-inverting input terminal connected to the connection point of the resistors R21 and R22 of the voltage detection circuit 6, and an inverting input terminal connected to a voltage source E1 providing the reference voltage Vr. The comparator CP1 has a non-inverting input terminal connected to the connection point of the resistors R31 and R32 of the voltage detection circuit 61, and an inverting input terminal connected to a voltage source E2 providing a reference voltage Vr1. The AND circuit AND has one input terminal connected to an output terminal of the comparator CP, another input terminal connected to an output terminal of the comparator CP1, and an output terminal connected to the drive circuit 210.

In short, in the example of FIG. 5, comparators (hereinafter referred to as "detection comparators") CP and CP1 for comparing the detection voltages Vd and Vd1 with the reference voltages Vr and Vr1 are provided individually to the sub converters 22 and 23. The AND circuit AND receives outputs from all of the detection comparators CP and CP1 and then provides an output to the drive circuit 210 of the main converter 21.

In the example of FIG. 5, when the output of the aforementioned AND circuit AND turns into an L level, the drive circuit 210 of the main converter 21 determines that any of short circuits of the switching elements Q2 and Q3 of the sub converters 22 and 23 occurs, and then terminates driving of the switching element Q1.

In other words, only while all of the detection voltages Vd and Vd1 of the sub converters 22 and 23 occur normally, the switching element Q1 in the main converter 21 is kept being driven and then the thyristor Q0 is kept on.

Further, in the example of FIG. 5, the drive circuit 210 of the main converter 21 may drive the switching element Q1 regardless of the output from the AND circuit AND during the aforementioned starting period.

As described above, the power supply device of the present embodiment includes the following first to sixth features.

In the first feature, the power supply device includes: the parallel circuit 4 of the thyristor Q0 and the thermistor PTH having a positive temperature property; the DC power supply circuit 1 to receive power through the parallel circuit 4; and multiple buck converters 20 connected in parallel with each other between output ends of the DC power supply circuit 1. Each of the buck converters 20 (21, 22, 23) includes: a series circuit which is defined as a series circuit of the diode (D1, D2, D3) and the switching element (Q1, Q2, Q3) and is connected between output ends of the DC power supply circuit 1; the capacitor (C1, C2, C3) having opposite ends serving as the output ends; the inductor (N11, N21, N31) constituting a loop together with the diode (D1, D2, D3) and the capacitor (C1, C2, C3); and the drive circuit (210, 220, 230) configured to drive the switching element (Q1, Q2, Q3). One of the multiple buck converters 20 serves as the main converter 21 which includes the secondary winding N12 associated with the inductor N11 and is to turn on the thyristor Q0 in accordance with a voltage induced in the secondary winding N12. When a short circuit of the switching element (Q2, Q3) of any of the other buck converters 20 (22, 23) occurs, the drive circuit 210 of the main converter 21 terminates driving of the switching element Q1.

In other words, the power supply device includes: a parallel circuit 4 of a thyristor Q0 and a thermistor PTH having a positive temperature coefficient; a DC power supply circuit (the boost converter) 1 having a pair of output ends 11 and 12 and being to receive power through the parallel circuit 4; and multiple buck converters 20 connected in parallel with each other between the pair of output ends 11 and 12 of the DC power supply circuit 1. The multiple buck converters 20 include a main converter 21 and at least one sub converter (22, 23). Each of the main converter 21 and the at least one sub converter (22, 23) includes: a series circuit composed of a diode (D1, D2, D3) and a switching element (Q1, Q2, Q3); a series circuit composed of a capacitor (C1, C2, C3) and an inductor (N11, N21, N31); and a drive circuit (210, 220, 230) configured to drive the switching element (Q1, Q2, Q3). The series circuit composed of the diode (D1, D2, D3) and the switching element (Q1, Q2, Q3) is connected between the pair of output ends 11 and 12 of the DC power supply circuit 1. The series circuit composed of the capacitor (C1, C2, C3) and the inductor (N11, N21, N31) is connected in parallel with the diode (D1, D2, D3). The main converter 21 further includes a (first) secondary winding N12 magnetically coupled with the (first) inductor N11 of the main converter 21. The main converter 21 is configured to control the thyristor Q0 in accordance with a voltage across the (first) secondary winding N12 of the main converter 21. The (first) drive circuit 210 of the main converter 21 is configured to, when a short circuit of the (second) switching element (Q2, Q3) of the at least one sub converter (22, 23) occurs, terminate driving of the (first) switching element Q1 of the main converter 21.

In the second feature realized in combination with the first feature, with regard to all of the buck converters 20 (22, 23) other than the main converter 21, the inductor (N21, N31) is associated with the secondary winding (N22, N32). When a voltage does not occur across the secondary winding (N22, N32) of any of the other buck converters 20 (22, 23), the drive circuit 210 of the main converter 21 terminates driving of the switching element Q1. In other words, the at least one sub converter (22, 23) includes a (second) secondary winding (N21, N22) magnetically coupled with the (second) inductor (N21, N31) of the at least one sub converter (22, 23). The (first) drive circuit 210 of the main converter 21 is configured to, when a voltage across the (second) secondary winding (N22, N32) of the at least one sub converter (22, 23) falls below a reference voltage, determine that a short circuit of the (second) switching element (Q2, Q3) of the at least one sub converter (22, 23) occurs. Note that, the second feature is optional.

In the third feature realized in combination with the first or second feature, the drive circuit 210 of the main converter 21 drives the switching element Q1 regardless of whether a short circuit of the switching element (Q2, Q3) of another buck converter 20 (22, 23) until predetermined delay time t1 elapses after activation. In other words, the (first) drive circuit 210 of the main converter 21 is configured to drive the (first) switching element Q1 of the main converter 21 in spite of whether a short circuit of the (second) switching element (Q2, Q3) of the at least one sub converter (22, 23) occurs, until predetermined delay time t1 elapses after activation. Note that, the third feature is optional.

In the fourth feature realized in combination with any one of the first to third features, the main converter 21 is configured to, when a voltage across the (first) secondary winding N12 of the main converter 21 exceeds a prescribed voltage, turn on the thyristor Q0. Note that, the fourth feature is optional.

In the fifth feature realized in combination with any one of the first to fourth features, the DC power supply circuit (the boost converter) 1 is configured to use supplied power to generate a predetermined DC voltage between the pair of output ends 11 and 12. Note that, the fifth feature is optional.

In the sixth feature realized in combination with any one of the first to fifth features, the drive circuit (210, 220, 230) of each of the multiple buck converters 20 is configured to drive the switching element (Q1, Q2, Q3) to adjust a voltage between opposite ends of the capacitor (C1, C2, C3). Note that, the sixth feature is optional.

According to the aforementioned power supply device of the present embodiment, even when any of short circuits of the switching elements (Q2, Q3) of the buck converters 20 occurs, the thyristor Q0 is turned off and suppression of current by the thermistor PTH becomes effective. Therefore, in contrast to a case where the thyristor Q0 is turned off only when all of short circuits of the switching elements (Q1, Q2, Q3) of the buck converters 20 occur, the present embodiment can provide improved safety.

The invention claimed is:

1. A power supply device comprising:
    a parallel circuit of a thyristor and a thermistor having a positive temperature coefficient;
    a DC power supply circuit having a pair of output ends and being to receive power through the parallel circuit; and
    multiple buck converters connected in parallel with each other between the pair of output ends of the DC power supply circuit,
    the multiple buck converters including a main converter and at least one sub converter,
    each of the main converter and the at least one sub converter including
        a series circuit which is composed of a diode and a switching element and is connected between the pair of output ends of the DC power supply circuit,
        a series circuit which is composed of a capacitor and an inductor and is connected in parallel with the diode, and
        a drive circuit configured to drive the switching element,
    the main converter further including a secondary winding magnetically coupled with the inductor of the main converter,
    the main converter being configured to control the thyristor in accordance with a voltage across the secondary winding of the main converter, and
    the drive circuit of the main converter being configured to, when a short circuit of the switching element of the at least one sub converter occurs, terminate driving of the switching element of the main converter.

2. The power supply device according to claim 1, wherein:
    the at least one sub converter includes a secondary winding magnetically coupled with the inductor of the at least one sub converter; and
    the drive circuit of the main converter is configured to, when a voltage across the secondary winding of the at least one sub converter falls below a reference voltage, determine that a short circuit of the switching element of the at least one sub converter occurs.

3. The power supply device according to claim 1, wherein the drive circuit of the main converter is configured to drive the switching element of the main converter in spite of whether a short circuit of the switching element of the at least one sub converter occurs, until predetermined delay time elapses after activation.

4. The power supply device according to claim 1, wherein the main converter is configured to, when a voltage across the secondary winding of the main converter exceeds a prescribed voltage, turn on the thyristor.

5. The power supply device according to claim 1, wherein the DC power supply circuit is configured to use supplied power to generate a predetermined DC voltage between the pair of output ends.

6. The power supply device according to claim 1, wherein the drive circuit of each of the multiple buck converters is configured to drive the respective switching element to adjust a voltage between opposite ends of the respective capacitor.

\* \* \* \* \*